(12) United States Patent
Anderson

(10) Patent No.: US 12,333,554 B2
(45) Date of Patent: Jun. 17, 2025

(54) SYSTEM AND METHOD FOR SUGGESTING AND GENERATING A CUSTOMER SERVICE TEMPLATE

(71) Applicant: Verint Americas Inc., Alpharetta, GA (US)

(72) Inventor: Grant Anderson, Erskine (GB)

(73) Assignee: Verint Americas Inc., Alpharetta, GA (US)

( * ) Notice: Subject to any disclaimer, the term of this patent is extended or adjusted under 35 U.S.C. 154(b) by 461 days.

(21) Appl. No.: 17/902,495

(22) Filed: Sep. 2, 2022

(65) Prior Publication Data

US 2024/0078559 A1 Mar. 7, 2024

(51) Int. Cl.
| | |
|---|---|
| G06F 17/00 | (2019.01) |
| G06F 40/186 | (2020.01) |
| G06F 40/279 | (2020.01) |
| G06F 40/35 | (2020.01) |
| G06F 40/40 | (2020.01) |
| G06Q 30/016 | (2023.01) |

(52) U.S. Cl.
CPC ......... *G06Q 30/016* (2013.01); *G06F 40/186* (2020.01); *G06F 40/279* (2020.01); *G06F 40/35* (2020.01); *G06F 40/40* (2020.01)

(58) Field of Classification Search
CPC ........ G06F 40/279; G06F 40/30; G06F 40/35; G06F 40/186; G06F 40/56; G06F 40/40; G06Q 30/016; H04M 3/5166
USPC .......................................................... 704/9
See application file for complete search history.

(56) References Cited

U.S. PATENT DOCUMENTS

| | | | | |
|---|---|---|---|---|
| 9,247,061 | B2* | 1/2016 | Erhart | H04M 3/5166 |
| 2014/0270145 | A1* | 9/2014 | Erhart | H04M 3/5166 |
| | | | | 379/265.13 |
| 2017/0364519 | A1* | 12/2017 | Beller | G06F 40/30 |

FOREIGN PATENT DOCUMENTS

| | | |
|---|---|---|
| CN | 110442675 A | 11/2019 |
| CN | 110516059 A | 11/2019 |

(Continued)

OTHER PUBLICATIONS

IBM Watson Assistant, accessible at: https://emerj.com/ai-sector-overviews/artificial-intelligence-customer-service-current-future-applications/, retrieved Nov. 14, 2022.

*Primary Examiner* — Md S Elahee
(74) *Attorney, Agent, or Firm* — Christopher M. Scherer; Erin Ella Block; DeWitt LLP

(57) ABSTRACT

The template generation system receives interaction data stored by the CEC from an interaction database and customer service templates (if any) from a template database. The template generation system processes interaction data and customer service templates to learn the domain language of CSR responses and the template responses within the CEC. The template generation system encodes the learned language and generates sentence vector embeddings for the CSR responses and template responses. Based on the learned language, the encoding, and the sentence vector embeddings, the template generation system processes CSR responses derived from the interaction data and customer service templates to predict the need for new customer service templates. Based on the predicted need for new customer service templates, the template generation system provides customer service template suggestions and may also auto-generate suggested customer service templates.

20 Claims, 8 Drawing Sheets

(56) References Cited

FOREIGN PATENT DOCUMENTS

| | | | |
|---|---|---|---|
| CN | 110543552 | | 12/2019 |
| CN | 111325387 | A | 6/2020 |
| CN | 111143540 | B | 7/2020 |
| CN | 111666399 | A | 9/2020 |
| CN | 118332170 | A * | 7/2024 |

* cited by examiner

Fig. 2A

Generate communication sentence vector embeddings for response communications and template sentence vector embeddings for response templates
210

Receive communication sentence vector embeddings, template sentence vector embeddings, and associated data at an intent clustering component
211

For each response communication, determine if it has the same semantic intent as any of the template responses
212

Remove response communications and associated communication sentence vector embeddings determined to have the same semantic intent as any template responses from consideration in clustering and template generation
213

Reduce dimensionality of communication sentence vector embeddings
214

Cluster sentence vector embeddings with similar semantic intent
215

Obtain final clusters for communication sentence vector embeddings and generate analytics report and new customer service templates based on the final cluster results
216

Display clustering results, analytics report and/or generated customer service templates
217

Store generated customer service templates, final clusters, clustering results and analytics reports
218

FIG. 2B

SYSTEM AND METHOD FOR SUGGESTING AND GENERATING A CUSTOMER SERVICE TEMPLATE

FIELD

The present disclosure is directed to machine learning suggested and generated response templates for customer service interactions in a customer engagement system.

BACKGROUND

In a customer engagement center (CEC), interactions take place between agents and customers for help with various issues. Much of the work performed by customer service representatives (CSRs) is repetitive in nature. A majority of a CSR's job is to receive customer inquiries/questions and to provide responses to those inquiries/questions. The time taken for a CSR to compose a response can become significant. When common customer issues occur, a CSR can find themselves spending considerable time repeatedly composing the same response. Further, a CEC spends considerable time, expenses, and resources to train and develop training materials for CSRs to properly and uniformly respond to customer inquiries/questions.

Currently, there are conventional approaches that provide the ability to manually create and use response templates. However, these systems are completely user (e.g., CSR or other CEC personnel) driven. For the template features to be effective, a CEC must incur significant administrative costs to manually determine the content of the template (i.e., what templates should exist) and then manually author the templates (i.e., actually create the template in the system). CSRs and administrative personnel must spend considerable time and effort in order to identify the need for a particular template and to author it appropriately. This can result in the client and CSRs neglecting the templates as they are either not useful (through poor authoring) or they cannot justify spending the time discovering good candidates for templates. Further, most conventional approaches allow individual CSR's, managers, supervisors, etc. to manually create their own personally authored, list of external templates. This reduces efficiency and consistency in responses provided in customer interactions.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, according to certain embodiments a method is disclosed that includes receiving interaction data from an interaction database. The method includes receiving a plurality of customer service templates from a template database. The method furthermore includes extracting customer service representative (CSR) response data from the interaction data. The method in addition includes normalizing the CSR response data and the plurality of customer service templates. The method moreover includes generating a set of response communications from the normalized CSR response data. The method also includes generating a set of response templates from the normalized plurality of customer service templates. The method furthermore includes building a vocabulary from words in the set of response communications and the set of response templates. The method moreover includes generating a plurality of vector embeddings for the vocabulary. The method also includes transmitting the plurality of vector embeddings, the set of response communications, and the set of response templates to a sentence embedding component. The method in addition includes generating a communication sentence vector embedding for each response communication and a template sentence vector embedding for each response template based on the plurality of vector embeddings for the vocabulary. The method furthermore includes predicting new customer service templates from the template sentence vector embeddings and the communication sentence vector embeddings. The method also includes generating new customer service templates based on the predicting. Other embodiments of this aspect include corresponding computer systems, apparatus, and computer programs recorded on one or more computer storage devices, each configured to perform the actions of the methods.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

BRIEF DESCRIPTION OF THE DRAWING(S)

FIGS. 2A and 2B depict a flowchart of an example of a method for suggesting and generating customer service templates, according to certain embodiments.

DETAILED DESCRIPTION

Figure 1A:
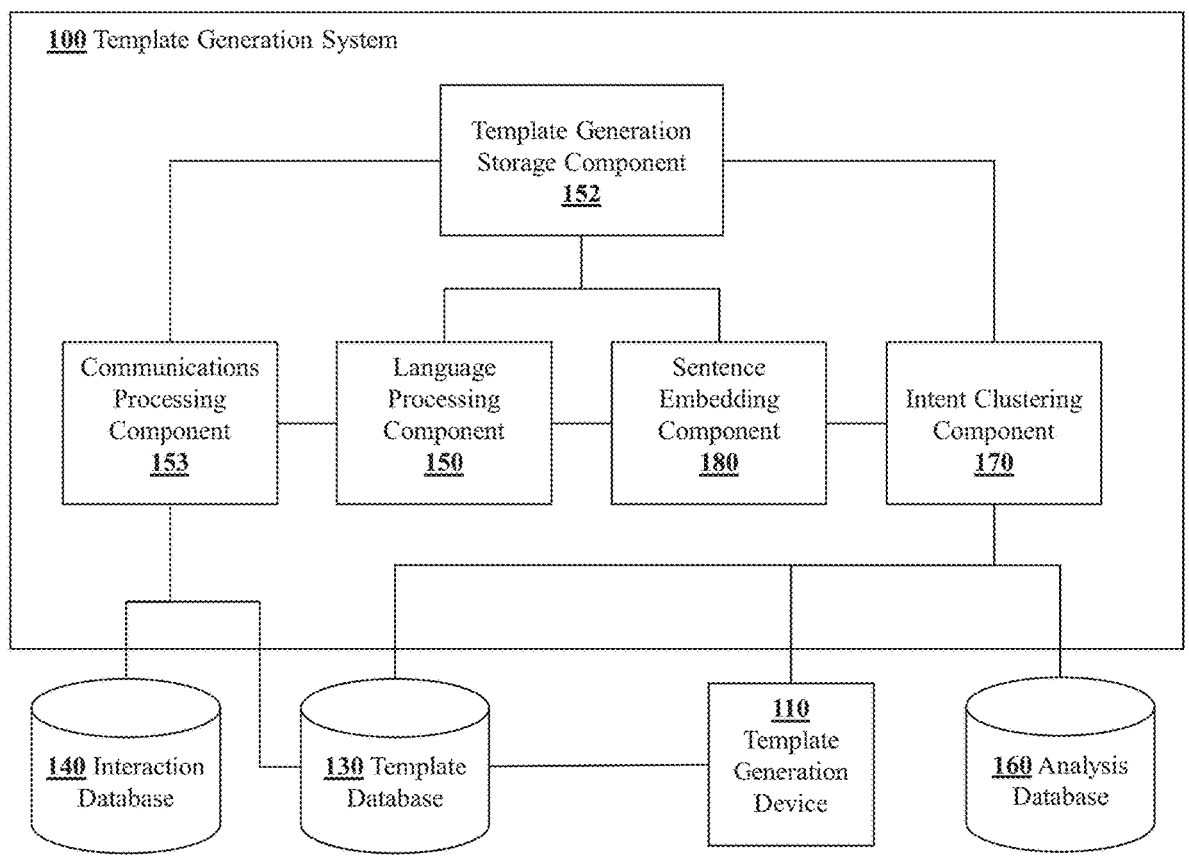
FIGS. 1A and 1B depict an example of a template generation system and data flow for suggesting and generating customer service templates, according to certain embodiments.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims.

There is an unmet need in the art for a system capable of using machine learning to predict the need for templates for commonly used responses with the same semantic intent but not necessarily the same content and using machine learning to suggest and generate said templates. In customer engagement centers, CSRs may be spread out over many different facility locations and/or working remote from any facility location. Further, a CSR may receive customer inquiries/questions pertaining to any number of subject matters including products, support, trouble shooting, pricing, ordering, and any number of other topics. A quick, consistent, and accurate response from the CSR is important to maintaining customer satisfaction and maintaining efficiency in handling inquires/questions throughout the customer engagement center.

A bank of template responses to common inquires/questions specified for the customer engagement center's domain would be extremely beneficial. However, using conventional approaches, the time and labor it would take to identify responses with the same semantic intent and determining if those responses warrant a templated response would be overly time consuming and the resulting manually-created templates would be inconsistent.

Responses that have the same intent are responses that, relative to each other, are determined semantically mean the same thing, but may not use the same words or sentences to convey the meaning. As a non-limiting example, responses of "can I help you with something," "what can I assist you with," or "what can I do for you today," may all have the same intent (i.e., determining what the customer's query is), but do not use the same words/sentences to express that intent. As another non-limiting example, responses of "thank you," "it was a pleasure assisting you today," or "we appreciate your call," may have the same intent (i.e., to show gratitude to the customer), but again do not use the same words/sentences to express that intent.

Modern contact centers and CECs utilize numerous channels of communications to connect customers with CSRs, including but not limited to audio communication channels such as, but not limited to, voice over IP (VOIP), telephony, video chat, etc. and text-based communication channels including, but not limited to e-mails, live chat, social media Sort Message Service (SMS) messaging. The interactions and transaction history of the interactions between customers and the CEC over these channels is maintained by the contact center. The interactions may be stored by the CEC as interaction data in an interaction database or as interaction data structures in appropriate data storage. For example, if a customer initiates a chat session, the customer's communication data and the CSRs communication data for the chat session is stored by the CEC. As another example, if a telephone or video interaction is started with a customer the audio data from the interaction is diarized and transcribed by the CEC and stored as indication data by the CEC. The CEC will also store transaction history data about each interaction such as, but not limited to, customer identification data, interaction identification data, CSR identification data, etc. which is also stored with the interaction data. The transaction history data may be associated with the interaction data and stored in the interaction database or within fields of the interaction data structures.

By analyzing interactions stored by the CEC a template generation system can suggest common CSR responses warranting a response template and auto-generate said suggested response templates. The template generation system can allow an organization to achieve several key benefits. First, the template generation system can be integrated with existing CEC systems, allowing CSRs to continue using current, familiar CEC systems. Second, the template generation system can predict CSR responses within customer communications provided by the CEC system that would benefit from a template and create template responses that can be used by CSRs of the CEC system in future interactions. Third, the template generation system can provide reports on varied results of analysis on CSR responses.

The template generation system receives interaction data stored by the CEC from an interaction database and customer service templates (if any) from a template database. The interaction data is generated from interactions between customers and CSRs received by the CEC system. The customer service templates are either generated by the template generation system or may be generated by users of the CEC system. The template generation system processes interaction data and customer service templates to train a model on the domain language of CSR responses and the template responses within the CEC. The template generation system encodes the modeled language and generates sentence vector embeddings for the CSR responses and template responses. Based on the modeled language, the encoding, and the sentence vector embeddings, the template generation system processes CSR responses derived from the interaction data and customer service templates to predict the need for new customer service templates. Based on the predicted need for new customer service templates, the template generation system provides customer service template suggestions and may also auto-generate suggested customer service templates.

Figure 1B:
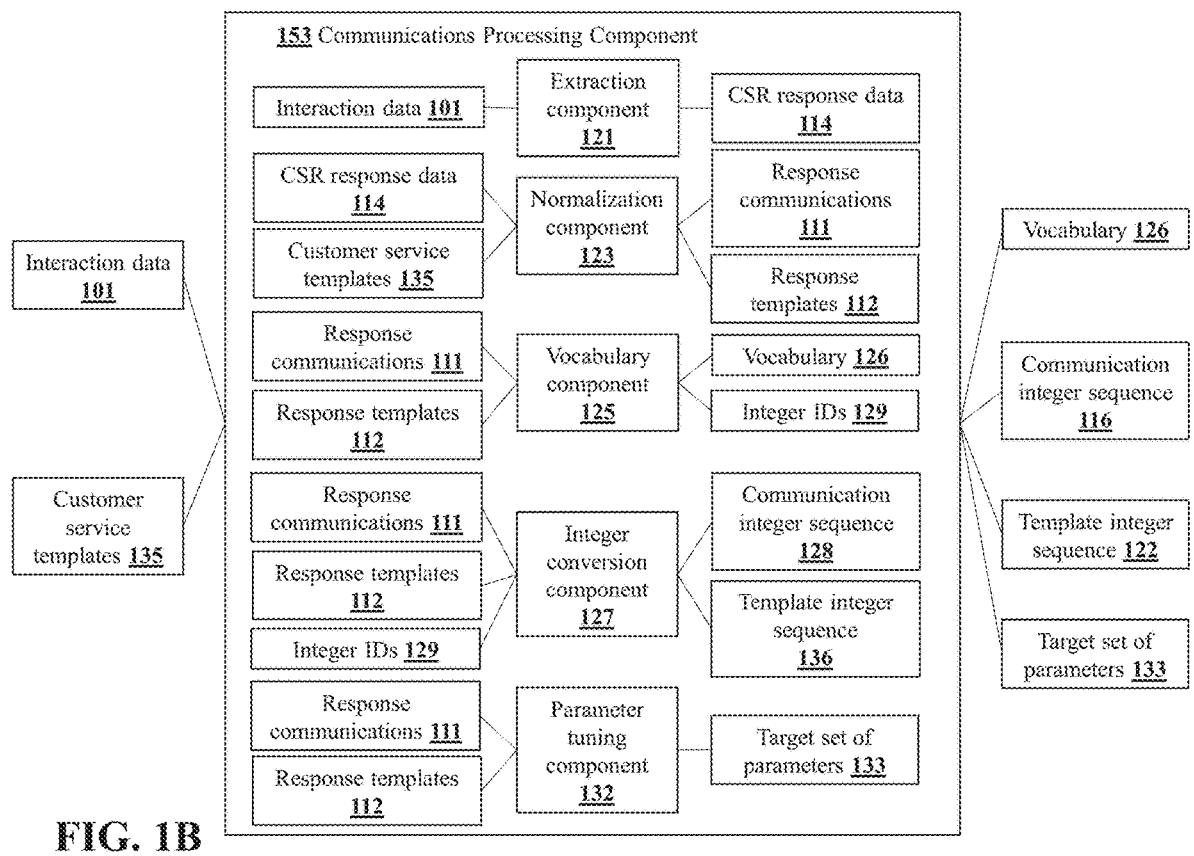

FIG. 1A depicts an example embodiment of a template generation system 100 with its components, services, and processes according to certain embodiments. FIG. 1B depicts an example of a communications processing component 153 used in the template generation system 100, according to certain embodiments.

In an embodiment, the template generation system 100 may be part of the CEC system (not shown) or may be a separate component integrated with the CEC system or any other company system that receives and stores customer communications and stores customer service templates. The template generation system 100 interacts with an interaction database 140 to receive interaction data 101 and a template database 130 to receive customer service templates 135.

The template generation system 100 includes a communications processing component 153 to prepare the interaction data 101 and the customer service templates 135 for encoding and to generate a vocabulary for the domain language, a language processing component 150 to generate word vector embeddings and sentence vector embeddings for the encoded interaction data 101 and the customer service templates 135, and an intent clustering component 170 for grouping interaction data 101 with similar intent and to predict, suggest, and generate new customer service templates 135 and analytics reports. Each of these components will be described in greater detail below. Employees of the CEC (customer service representatives (CSRs), supervisors, personnel, administrators, etc.) hereinafter collectively referred to as CSRs may interact with the CEC system and template generation system 100. The template generation system 100 optionally includes one or more template generation devices 110 useable by CSRs for interacting with the template generation system 100.

In an embodiment, interaction data 101 is stored by the CEC system in the interaction database 140. In an embodiment, the interaction data 101 may be stored by the CEC system in any appropriate media storage. Interaction data 101 may include all interactions within the CEC system, including, but not limited to synchronous and asynchronous communications including audio and/or written communications between customers and CSRs of the CEC. As indicated above, CECs use numerous channels for communication. Audio communications include any channel the CEC employs where the communication is vocal, such as, but not limited to telephone, voice over IP, video chat, or any other voice communication. Written communications include any channel the CEC employs where the communication is textual, such as, but not limited to emails, web chats, applications, social media platforms or any other method of text communication between the CSR and a customer. The interactions include any one-way or two-way communications between customers and CSRs that are received by the CEC system. The interactions, whether text-based or audio-based, may occur and be recorded and stored in parallel such that multiple communications are ongoing at any one time, such as at a CEC or multiple independent and decentralized agents acting at the same time.

The interaction data 101 are the stored interactions received by the CEC along with any interaction history associated with each interaction. For example, if a customer initiates a chat session (or some other form of textual/written communication), the interaction will consist of the customer's communications and the CSRs communications for the chat session. All portions of the interaction are stored by the CEC as interaction data 101 with each portion including a label identifying the actor for the portion, for example customer, CSR, etc. As another example, if a telephone or video interaction is started with a customer (or some other form of audio communication), the audio data from the interaction will include the customer's audio communications and the CSR's audio communications for the interaction. The audio data for the audio communication is diarized and transcribed by the CEC and stored as interaction data 101 which includes labels for each speaker segment in the audio data including, but not limited to the customer and the CSR(s). The CEC will also store transaction history data about each interaction such as, but not limited to, customer identification data, interaction identification data, CSR identification data, etc. which is also stored with the interaction data. Transaction history data may be associated with the interaction data 101 and stored in the interaction database 140.

In an embodiment, each interaction data 101 may be represented as an interaction data structure including fields for all associated information. In an embodiment, each interaction data 101 may be represented as an object, including attributes for all associated information. It should be understood that these are merely examples and that any appropriate structure for containing all information associated with an individual interaction may be used.

Customer service templates 135 are standardized CSR responses that can be used by CSRs in responding to customer communications within a CEC system. Customer service templates 135 include response data and may also include response metadata. The response data is the text of the standardized CSR response. In an embodiment, the response data may include fillable fields within the text of the response where the CEC system may automatically fill in the appropriate details based on current customer communication information or a CSR will need to fill in appropriate details based on the customer communication to which the CSR is responding. As a non-limiting example, the customer service template 135 may call for the customer's name or an account number to be inserted into the text of the response data prior to speaking or sending the response data to the customer. In an embodiment, the fillable fields of the customer service template 135 include associated metadata that instructs the CEC system to access a customer profile for the customer of the communication to which the CSR is responding and automatically insert the appropriate customer information into the fillable field. As a non-limiting example, if the fillable field called for the customer's name, the CEC could access the customer profile and insert the customer's name into the fillable field of the customer service template 135. The response metadata may include response categorization and/or tagging, alternate response text, etc. Further, in embodiments, the customer service templates 135 may be made available to the CEC system and to CSRs in a categorized or hierarchical manner that groups customer service templates 135 with similar response metadata in a manner determined by the CEC system.

In an embodiment, each customer service template 135 may be represented as a template data structure including fields for all associated information. In an embodiment, each customer service template 135 may be represented as an object, including attributes for all associated information. It should be understood that these are merely examples and that any appropriate structure for containing a customer service template 135 and all information associated with the customer service template 135 may be used.

Analytics reports include suggested responses to be added as a new customer service template 135. The analytics reports may include a number of analytics results from the intent clustering component 170 prediction of CSR responses recommended to become a customer service template 135. The results include but are not limited to analyzed clustering results from intent clustering component 170 providing the clusters with the greatest number of CSR responses, the total number of CSR responses in each cluster, the CSR response within each cluster with the greatest representation within the cluster, and/or a ranking of CSR responses within each cluster.

In an embodiment, customer service templates 135 are store by the CEC system in the template database 130. In an embodiment, customer service templates 135 may be stored by the customer service center system in any appropriate media storage. In an embodiment, analytics reports are stored by the CEC system in the analysis database 160. In an embodiment, analytics reports may be stored by the customer service center system in any appropriate media storage.

The template generation system 100 includes a communications processing component 153 to receive interaction data 101 from the interaction database 140 and customer service templates 135 from the template database 130. The communications processing component 153 performs multiple processing procedures, described further below, on the interaction data 101 and the customer service templates 135 to generate response communications 111 and response templates 112 for modeling by the language processing component 150 and generating sentence vector embeddings by the sentence embedding component 180. In an embodiment, the communications processing component 153 may be a processor or a combination of a processing system and a storage system with a preprocessing software component and an optional preprocessing storage.

In an embodiment, the customer service center system and/or the template generation system 100 provides a request to the communications processing component 153 to generate response communications 111 and response templates 112 for encoding and sentence vector embedding to predict and generate new customer service templates. In an embodiment, the request includes, but is not limited to, a date/date range that determines what interaction data 101 is received by the communications processing component 153. As a non-limiting example, if the date/date range received is for a specific week, the interaction data 101 received will be for interactions from that specific week.

In an embodiment, the request is generated based any one of a user requesting template prediction and generation, the system automatically requesting template prediction and generation, and/or rules governing the automated generation of templates. As non-limiting examples, some rules may be based on the time elapsed since templates were last generated, the quantify of interactions that have occurred since templates were last generated, a change in customer satisfaction scores since templates were last generated, etc. For example, a rule might indicate that new templates should be generated once every week or once every month. As another example, a rule might indicate that new templates should be generated whenever the customer satisfaction scores are outside of a given range or change by a specified percentage. Over time, the template generation system 100 or the CEC system may use machine learning techniques to learn and update the rules governing the automated generation of new customer service templates based on analysis of interaction data 101 and other CEC system scored metrics.

Response communications 111 are generated from interaction data 101. Response communications 111 are interaction data 101 that are processed by the communications processing component 153 to be in the format required for encoding and for the sentence embedding component 180. Each response communication 111 includes textual interaction data 101 labeled as CSR communications. CSR communications are the portion of an interaction provided by the CSR to the CEC system. Response templates 112 are generated from customer service templates 135. Response templates 112 are customer service templates 135 that are processed by the communications processing component 153 to be in the format required for encoding. As described in greater detail below, the communications processing component 153 extracts all CSR communications from the interaction data 101 and normalizes the CSR communications to create the response communications 111. As described in greater detail below, the communications processing component 153 extracts the text response portion of the customer service templates 135 and normalizes the text responses to create the response templates 112. The response communications 111 and response templates 112 may also be used to teach the template generation system 100 the domain language of the CEC system and train the language processing component 150.

The communications processing component 153 uses an extraction component 121 to generate CSR response data 114. In an embodiment, the extraction component 121 extracts CSR communications from the interaction data 101 by removing any portions of the interaction data not labeled as being CSR communications. As discussed above the interaction data 101 includes interactions between customers and CSRs that have been transcribed, diarized, and labeled based on speaker/writer (customer, CSR, etc.). In other words, the extraction component 121 removes all interaction data 101 that is not a response from the CSR in an interaction. In embodiments, the CSR response data 114 include the text of the CSR communication and associated data related to the CSR communication, including, but not limited to, date and time of the CSR communication, duration of the CSR communication, customer identification information associated with the interaction for the CSR communication, etc. The associated data may be used for reporting analytics.

The communications processing component 153 uses a normalization component 123 to generated response communications 111 from CSR response data 114 and response templates 112 from customer service templates 135. The normalization component 123 cleans the CSR response data 114 and customer service templates 135 to render response communications 111 and response templates 112 in a standard format. The normalization of both the CSR response data 114 and the customer service templates 135 allows for the language of both to train and influence the vocabulary 126 and language processing component 150 of the template generation system 100 and allows the response communications 111 to be compared to the response templates 112 to avoid duplicate templating. Generally, the normalization involves removing punctuation, standardizing word formats (e.g., no conjunctions), and removing other markups the CEC system inserts into the interaction data 101 or the customer service templates 135. Normalization of CSR response data 114 also involves removing customer/interaction specific phrases/words and replacing the removed words with placeholders (e.g., "Mr. Smith" would be replaced with placeholder "customer name" or a specific account number replaced with placeholder "account number"), In one embodiment the, normalization of CSR response data 114 includes removing system messages/information, converting the text to all lower case, expanding contractions, removing punctuation, removing whitespace, removing non-ascii characters, setting an individual minimum and maximum length of CSR response data 114 for rendering as response communications 111, and appending special indicators to CSR response data 114 for rendering as response communications 111 indicating the start and end of each response communication 111. In embodiments, the minimum and maximum length of the response communications 111 may be based on a pre-determined threshold range, for example the minimum and maximum length of response templates 112, or the like. Having a minimum length for the response communications 111 ensures that responses considered too short for templating are not considered and do not influence the language processing component 150 or the intent clustering component 170. Having a maximum length for the response communications 111 ensures that responses considered too long for templating are not considered and do not influence the language processing component 150 or the generation component.

In one embodiment, the normalization of CSR response data 114 also includes delexicalization of the CSR response data 114. The normalization component 123 analyzes the CSR response data 114 for rendering as response communications 111, removes language specific words/phrases (e.g., customer names, account numbers, addresses, product names, etc.) and replaces the removed words/phrases with agnostic template fields (e.g., a customer name would be replaced with a "customer name" insertion data field). In embodiments, the normalization component 123 uses natural language processing techniques such as named entity recognition, text classification, and keyword extraction and/or pattern recognition to both find and replace the language specific words/phrases. It should be understood that these are merely examples of techniques that may be used for finding and replacing language specific words/phrases and any applicable technique may be used. The language specific words/phrases are replaced with agnostic template fields. The agnostic template fields are predetermined data fields that correspond to data fields predefined by the CEC system. The agnostic template fields are included in generated customer service templates 135. When a customer service template 135 is used for an interaction, the system can access customer specific data and account information to automatically fill in the agnostic template fields of the customer service template 135 with language specific words/phrases found in the customer specific data and account information.

In one embodiment, the normalization of text response portion of customer service templates 135 includes: converting the text to all lower case, removing punctuation, removing whitespace, removing non-ascii characters, appending special indicators to customer service templates 135 for rendering as response templates 112 indicating the start and end of each response template 112, and optionally removing templates for other medium channels (i.e., audio, email, text, etc.) if concentrating on a specific channel for training.

The communications processing component 153 may utilize a vocabulary component 125 to build a vocabulary 126 from both the response communications 111 and the response templates 112. The vocabulary component 125 builds the vocabulary 126 to cover the words, symbols, and/or tokens in the response communications 111 and response templates 112. In certain embodiments, the vocabulary component 125 is a tokenizer.

The communications processing component 153 may utilize an integer conversion component 127 to convert the response communications 111 and the response templates 112 to communication integer sequences 128. Each word, symbol, and/or token in the vocabulary 126 is assigned an integer ID 129 using the vocabulary component 125. The integer conversion component 127 uses the integer IDs 129 to convert the text of both the response communications 111 and the response templates 112 to communication integer sequences 128 and template integer sequences 136, which can be processed by a model.

The communications processing component 153 may utilize a parameter tuning component 132 to find a set of parameters from the response communications 111 and response templates 112. A different model may have different parameters, which should be tuned to provide optimum model training. The parameter tuning component 132 runs a parameter tuning algorithm to select a target set of parameters 133 and data from the response communications 111 and response templates 112.

The template generation system 100 may further include a language processing component 150 to encode the vocabulary 126. The language processing component 150 transforms the vocabulary 126 into a plurality of vector embeddings. In an embodiment, the language processing component 150 is a transformer deep learning model including, but not limited to autoencoding language models, autoregressive language models, encoder-decoder language models. In an embodiment, the language processing component 150 is one of a Bidirectional Encoder Representations from Transformers (BERT), XLNet, Generative Pre-trained Transformer 2 (GPT-2), Generative Pre-trained Transformer 3 (GPT-3), ELECTRA, ALBERT, DistilBERT, or ROBERTa. In another embodiment, the language preprocessor 141 may be BERT-as-service, run either locally or remotely. In another embodiment, the language preprocessor 141 may be BERT-as-service run on a graphics processing unit (GPU) capable of running a TensorFlow open-source software library.

It should be understood that the encoding of the domain language of the CEC system is optional and that a pre-trained language processing component 150 may be used to generate the vector embeddings. However, the fine-tuning of a pre-trained language processing component 150 on the specific domain will result in a more accurate prediction of customer service templates needed. In embodiments using a pre-trained language processing component 150, the vocabulary 126 generated by the response communications 111, the response templates 112, does not need to be encoded prior to proceeding with sentence embedding and clustering, as described in further detail below.

The template generation system 100 may further include a sentence embedding component 180 which uses the vector embeddings from the language processing component 150 and the communication integer sequences 128 and template integer sequences 136 generated by the communications processing component 153 to obtain embeddings for each response communication 111 and each response template 112. The sentence embedding component generates a communication sentence vector embedding for each communication integer sequence 128 (each associated with a response communication 111) and a template sentence vector embedding for each template integer sequence 136 (each associated with a response template 112).

In an embodiment, the communication sentence vector embeddings and template sentence vector embeddings are achieved by averaging each individual word embedding for each communication integer sequence 128 each template integer sequence 136. In embodiments the communication sentence vector embeddings and template sentence vector embeddings are achieved by directly calculating the embedding for the full sentence. Full sentence embeddings may be generated through a number of techniques including unsupervised models (e.g., n-gram embeddings, skip-thought vectors, Word Mover's Embedding, Sentence-BERT) and supervised models (e.g., Generative Pre-trained Transformer, Deep Semantic Similarity Model, Universal Sentence Encoder).

Representing a word, phrase, sentence, or document by a vector of features (real numbers) allows for a mathematical understanding of natural language. These representations are known as vector embeddings and are normally hundreds of features in length. For simplicity, if every sentence can be represented by only 3 features, these sentences can be imagined as a point in 3D space (see FIG. 4). These features can be learned by a model in such a way that sentences with similar intents appear closer together.

Figure 4:
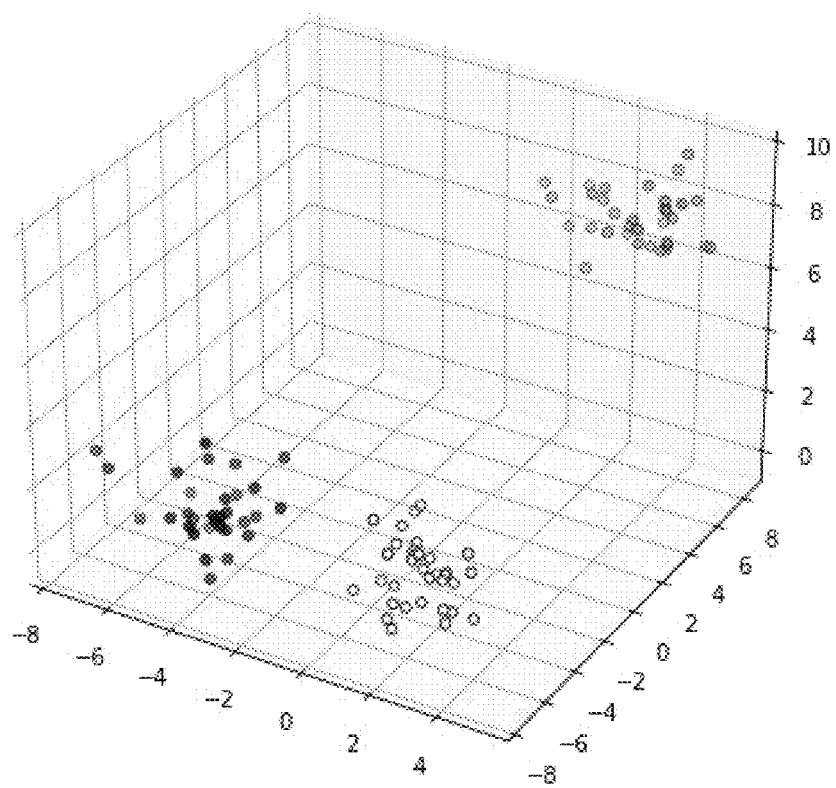
FIG. 4 depicts an example of a three-dimensional representation of clustered sentences, according to certain embodiments.

A density-based clustering algorithm is well suited to discover groups of responses which share the same space, and hence the same/similar intent but not necessarily the same content, as demonstrated by the shaded clusters in FIG. 4. The clustering allows the template generation system 100 to predict which CSR response data 114 warrant generating a new customer service template 135 based on the groupings of the response communications 111. Further the results of the clustering can be used to automatically suggest and/or generate the predicted customer service templates and/or generate an analytics report of the clustering results.

The template generation system 100 further includes an intent clustering component 170, which receives the communication sentence vector embeddings and template sentence vector embeddings along with any data associated with them, including, but not limited to associated response communications 111 and associated response templates, associated interaction data 101 and associated customer service templates 135. The intent clustering component 170 clusters communication sentence vector embeddings with similar intent to suggest and generate "new" customer service templates 135 and/or generate analytics reports. Many different clustering algorithms may be used. One example embodiment uses Density-Based Spatial Clustering of Applications with Noise (DBSCAN); however, given the problem of finding similar commonly used responses, any density-based clustering technique may be suitable. Another example embodiment uses Iterative Density-Based Spatial Clustering of Applications with Noise (ITER-DBSCAN), which is an iterative density-based clustering algorithm that allows for clusters of varying density. Additionally, partitioning clustering algorithms (such as affinity propagation, ward hierarchical clustering, mean-shift, etc.) that account for noise and do not require a set number of clusters may also be suitable. In embodiments, partitioning clustering algorithms that require a set number of clusters may be suitable through estimating the number of clusters required during hyperparameter tuning. Further, partitioning clustering algorithms that do not account for noise may be suitable.

In embodiments, the communication sentence vector embeddings are grouped together into regions such that embeddings tightly packed are grouped into a region, i.e., they have many nearby neighbors. In this embodiment, the intent clustering component 170 will group the communication sentence vector embeddings using the clustering algorithm based on a maximum distance between embeddings ($\varepsilon$—epsilon) and a minimum number of embeddings required to constitute a cluster (minPts). In embodiments that use DBSCAN, the above parameters $\varepsilon$ (epsilon) and minPts are provided. These parameters may be predetermined parameters or dynamically determined based on the communication sentence vector embeddings presented to the intent clustering component 170. As indicated above, $\varepsilon$ is the maximum distance between two samples which can be considered as in the neighborhood of each other. Too small a value of $\varepsilon$ will likely miss a substantial portion of the data points; too high and all the points may be grouped into the same cluster. MinPts is the minimum number of samples in a neighborhood before it can be considered a cluster. In embodiments, the parameters are chosen by a parameter tuning algorithm based on a Davies-Bouldin score of the clusters produced by the clustering algorithm for each candidate set of parameters.

The intent clustering component 170 obtains the final clusters for the communication sentence vector embeddings and generates an analytics report for the final clusters based on the communication sentence vector embeddings and associated data. In an embodiment, the analytics report may include a listing of clusters, the number of response communications 111 within each cluster, the most common response communication 111 within each cluster, a ranking of response communications 111 within each cluster, etc. The analytics report may suggest the creation of customer service templates 135 for a certain number of the biggest clusters (those with the most CSR response data 114, i.e., the most response communications 111) or choose the most commonly occurring response in each cluster as the candidate. The analytics reports may also include full results, which may be ranked by occurrence. The analytics reports are stored in an analysis database 160 for later use and access by CSRs.

Further, the intent clustering component 170 may recommend and/or generate "new" customer service templates 135 based on the analytics report by generating a customer service template 135 for a final cluster. The template may be generated in a number of ways and based on a number of factors. In an embodiment the intent clustering component 170 may generate a new customer service template for each of the final clusters or for each of the final clusters with a specified number of response communications 111 within the cluster or a final cluster with the greatest number of response communications. The text of response to be included in the customer service template 135 may also be based on a number of factors. In an embodiment the response may be the dominant response communication 111 within the cluster. Since the language specific words/phrases in the response communications 111 are replaced with agnostic data fields, the system can automatedly fill in the agnostic data fields with customer specific date as needed when the customer service template 135 is used in conjunction with an existing customer.

The intent clustering component 170 may store generated customer service templates 135 in the template database 130. The clustering results, final clusters and/or analytics reports may be stored in the analysis database 160

In an embodiment, prior to clustering, the intent clustering component 170 removes all communication sentence vector embeddings for response communications 111 that are already represented in a response template 112. This eliminates the likelihood that the intent clustering component 170 will recommend and generate a new customer service template 135 for a template that already exists. In this embodiment, the intent clustering component 170 may obtain the cosine similarity between the communication sentence vector embedding and all template sentence vector embeddings. The cosine similarity is a number between 0 and 1 with 0 being least similar and 1 being most similar. The intent clustering component 170 removes any communication sentence vector embedding (and its corresponding response communication 111) that has a cosine similarity for any template sentence vector embedding that is less than a similarity threshold (e.g., any similarity greater than 0.5). The similarity threshold may be a predetermined number or a dynamically determined number based on the cosine similarity for all cosine similarity determinations.

In an embodiment, prior to clustering, the intent clustering component 170 reduces the dimensionality of the communication sentence vector embeddings. This reduces the complexity of the features represented in the communication sentence vector embeddings and allows the clustering to be performed more efficiently. In an embodiment, the intent clustering component 170 reduces communication sentence vector embeddings dimensionality while maintaining a certain percentage of the variance between the given embeddings. The dimensionality of embeddings for sentence can be exceptionally large with an excess of five hundred features. Such a high number of dimensions can take a long time for clustering algorithms. In an embodiment, the intent clustering component 170 uses principal component analysis to reduce the dimensionality of the communication sentence vector embeddings while maintaining a specified percentage of the variation. By way of non-limiting example, 95% or 90% of the variation is maintained.

It should be understood that the percentage of variation may be a predetermined percentage or a dynamically determined percentage. Further the percentage of variation may also be determined based on the dimensionality of the embeddings. It should further be understood that any appropriate dimensionality reduction technique may be used to reduce the dimensionality of the embeddings, including factor analysis, linear discriminant analysis, t-distributed stochastic neighbor embedding, multidimensional scaling, etc.

Once the template generation system 100 generates new customer service templates 135, they are stored in the template database 130 and are available for use by users of the customer service center. In embodiments that use the normalized response communications 111 as the textual response portion for the newly generated template, when the template is used by a user in an interaction the customer service center system is able to look up customer information for the interaction and fill in the agnostic data fields with customer-specific data applicable to the agnostic data fields.

The interaction data 101, response communications 111, response templates 112, CSR response data 114, vocabulary 126, communication integer sequences 128, integer IDs 129, target set of parameters 133, customer service templates 135, template integer sequences 136, analytics reports, communication sentence vector embeddings, template sentence vector embeddings, final clusters, similarity threshold, clustering results, and agnostic data fields may be stored in template generate storage 152 or some other storage component for later use. Further, the interaction data 101, response communications 111, response templates 112, CSR response data 114, vocabulary 126, communication integer sequences 128, integer IDs 129, target set of parameters 133, customer service templates 135, template integer sequences 136, analytics reports, communication sentence vector embeddings, template sentence vector embeddings, final clusters, similarity threshold, clustering results, and agnostic data fields may be displayed on any of the template generation devices 110.

Figure 2A:
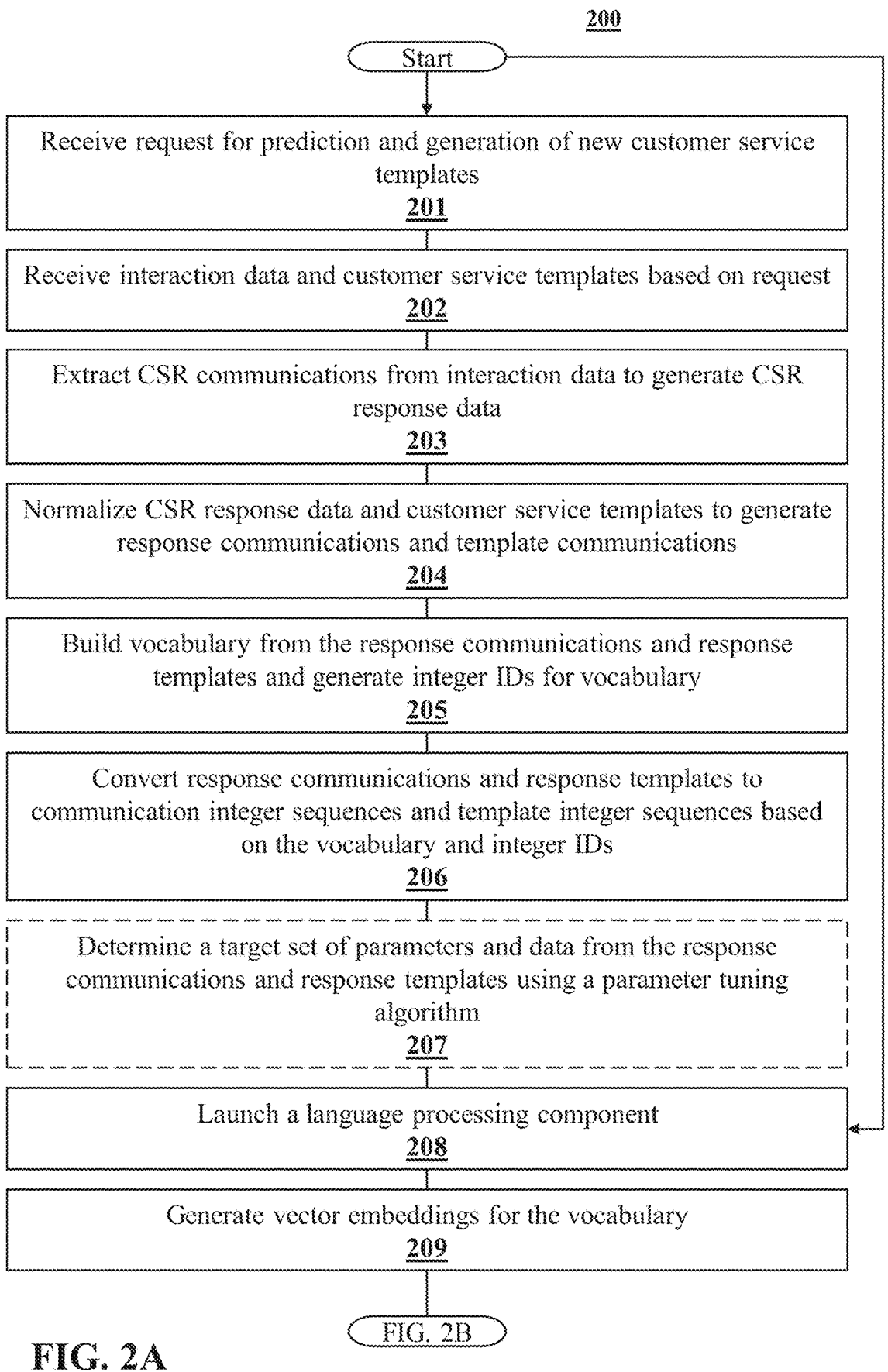

FIGS. 2A and 2B depict an example flow diagram of a method 200 for template prediction and generation according to certain embodiments. Blocks 201 through 207 form the data preprocessing blocks. Blocks 208 through 210 form the vector embedding blocks. Block 211 through 218 form the clustering and template generation blocks. The numbering and sequencing of the blocks are for reference only; blocks or sequences of blocks may be performed out of order or repeated.

In block 201, the template generation system 100 at the communications processing component 153 receives a request for the prediction and generation of new customer service templates 135. As indicated above, the request may be generated based any one of a user requesting template prediction and generation, the system automatedly requesting template prediction and generation, and/or rules governing the automated generation of templates. As non-limiting examples, some rules may be based on the time elapsed since templates were last generated, the quantify of interactions that have occurred since templates were last generated, a change in customer satisfaction scores since templates were last generated, etc.

In block 202, the communications processing component 153 receives interaction data 101 based on the request and customer service templates 135. Interaction data 101 are used to generate response communications 111 and customer service templates 135 are used to generate response templates 112. Response communications 111 and response templates 112 are used by the language processing component 150 to encode the response communications 111 and response templates 112 and generate communication sentence vector embeddings and template sentence vector embeddings, which allows the intent clustering component 170 to predict and generate new customer service templates 135.

in block 203, the communications processing component 153 using an extraction component 121 generates CSR response data 114 by extracting CSR communications from the interaction data 101. In an embodiment, the extraction component 121 extracts CSR communications from the interaction data 101 by removing any portions of the interaction data not labeled as being CSR communications. As discussed above the interaction data 101 includes interactions between customers and CSRs that have been transcribed, diarized, and labeled based on speaker/writer (customer, CSR, etc.). Depending on the size of the CEC and the level of customer interaction, the request may focus on one locale, time period, channel of communication, or any combination thereof.

In block 204, the communication processing component 153 using a normalization component 123 generates response communications 111 from CSR response data 114 and response templates 112 from customer service templates 135. The normalization component 123 cleans the CSR response data 114 and customer service templates 135 to render response communications 111 and response templates 112 in a standard format for encoding. In an embodiment, the normalization component 123 also performs delexicalization of the CSR response data 114. The normalization component 123 analyzes the CSR response data 114 for rendering as response communications 111, removes language specific words/phrases (e.g., customer names, account numbers, addresses, product names, etc.) and replaces the removed words/phrases with agnostic template fields (e.g., a customer name would be replaced with a "customer name" insertion data field).

In block 205, the communication processing component 153 using a vocabulary component 125 builds a vocabulary 126 from the response communications 111 and the response templates 112. Generate integer IDs 129 for each word in the vocabulary 126. In certain embodiments, the communication processing component uses a tokenizer component to build the vocabular to cover the most used words in the response communications and the response templates. In embodiments using a pre-trained language preprocessor or an already trained language preprocessor, this block may be skipped.

In block 206, the response communications 111 and the response templates 112 are converted to communication integer sequences 128 and template integer sequences 136 based on the generated vocabulary 126 by the communications processing component 153 using an integer conversion component 127. The integer conversion component 127 uses the integer IDs 129 to convert the text of both the response communications 111 and the response templates 112 to communication integer sequences 128 and template integer sequences 136, sequences which can be processed by a model.

In optional block 207, the communications processing component 153 using a parameter tuning component 132 runs a parameter tuning algorithm to select a target set of parameters 133 and data from the response communications 111 and response templates 112.

In block 208, the template generation system 100 launches a language processing component 150. The language processing component 150 is launched before or simultaneously with the creation of the response communications 111 and response templates 112. In an embodiment, the language preprocessor may be a Bidirectional Encoder Representations from Transformers (BERT). In another embodiment, the language preprocessor may be BERT-as-service, run either locally or remotely. In another embodiment, the BERT-as-service may be run on a graphics processing unit (GPU) capable of running the TensorFlow open-source software library.

In block 209, the language processing component 150 generates vector embeddings for the vocabulary 126.

In block 210, the template generation system 100 uses a sentence embedding component 180 to generate communication sentence vector embeddings for the communication integer sequences 128 (each associated with a response communication 111) and template sentence vector embeddings for the template integer sequences 136 (each associated with a response template 112) using the vector embeddings generated for the vocabulary 126. In an embodiment, the communication sentence vector embeddings and template sentence vector embeddings are achieved by averaging each individual word embedding for each response communication/template, respectively. In embodiments, the communication sentence vector embeddings and template vector embeddings are achieved by directly calculating the embedding for the full sentence. Full sentence embeddings may be generated through a number of techniques including unsupervised models (e.g., n-gram embeddings, skip-thought vectors, Word Mover's Embedding, Sentence-BERT) and supervised models (e.g., Generative Pre-trained Transformer, Deep Semantic Similarity Model, Universal Sentence Encoder).

In block 211, an intent clustering component 170 receives the communication sentence vector embeddings and template sentence vector embeddings, along with any data associated with them, including, but not limited to associated response communications 111 and associated response templates, associated interaction data 101 and associated customer service templates 135.

In optional block 212, the intent clustering component 170 determines if a response communication 111 has the same semantic intent as any of the response templates 112 by comparing the communication sentence vector embeddings to the template sentence vector embeddings. In an embodiment, the intent clustering component 170 calculates the cosine similarity between a communication sentence vector embedding and all template sentence vector embeddings for each communication sentence vector embedding. This allows the system to determine whether there is already a similar customer service template 135 corresponding to a response communication 111.

In optional block 213, the intent clustering component 170 removes from clustering and template generation consideration any response communication 111 and its associated communication sentence vector embedding determined to have the same semantic intent as any response template 112. In an embodiment, the intent clustering component 170 removed any response communication 111 and its associated communication sentence vector embedding with a cosine similarity to any template sentence vector embedding that is less than a similarity threshold. In an embodiment, the system uses a similarity threshold of any cosine similarity greater than 0.5.

In optional block 214, the intent clustering component 170 reduces the dimensionality of the communication sentence vector embeddings. In an embodiment, the intent clustering component uses principal component analysis to reduce the dimensionality of the communication vector embeddings while maintaining a specified percentage of the variation. By way of non-limiting example, 95% or 90% of the variation is maintained. It should be understood that the percentage of variation may be a predetermined percentage or a dynamically determined percentage. Further the percentage of variation may also be determined based on the dimensionality of the embeddings. It should further be understood that any appropriate dimensionality deduction technique may be used to reduce the dimensionality of the embeddings, including factor analysis, linear discriminant analysis, t-distributed stochastic neighbor embedding, multidimensional scaling, etc.

In block 215, the intent clustering component 170 clusters sentence vector embeddings with similar intent to suggest and generate "new" customer service templates and/or analytics reports. Many different clustering algorithms may be used. One example embodiment uses Density-Based Spatial Clustering of Applications with Noise (DBSCAN); however, given the problem of finding similar commonly used responses, any density-based clustering technique may be suitable. Additionally, partitioning clustering algorithms (such as affinity propagation, ward hierarchical clustering, mean-shift, etc.) that account for noise and do not require a provided number of clusters may also be suitable.

In embodiments, the communication sentence vector embeddings are grouped together into regions such that embeddings tightly packed are grouped into a region, i.e., they have many nearby neighbors. In this embodiment, the intent clustering component will group the communication sentence vector embeddings using the clustering algorithm based on a maximum distance between embeddings (E-epsilon) and a minimum number of embeddings required to constitute a cluster (minPts). In embodiments the above parameters ε (epsilon) and minPts are provided. These parameters may be predetermined parameters or dynamically determined based on the communication sentence vector embeddings presented to the intent clustering component. As indicated above, $\varepsilon$ is the maximum distance between two samples which can be considered as in the neighborhood of each other. Too small a value of ε will likely miss a substantial portion of the data points; too high and all the points may be grouped into the same cluster. MinPts is the minimum number of samples in a neighborhood before it can be considered a cluster. In embodiments, the parameters are chosen by a parameter tuning algorithm based on a Davies-Bouldin score of the clusters produced by the DBSCAN algorithm for each candidate set of parameters.

In block 216, the intent clustering component obtains the final clusters on the communication sentence vector embeddings and generates an analytics report of the final clusters along with the data associated with the communication sentence vector embeddings. Further, in embodiments the intent clustering component may recommend and/or generate new customer service templates based on the analytics report by generating a customer service template 135 for a final cluster. In an embodiment the response text for the customer service template 135 may be the dominant response communication 111 within the cluster. Since the language specific words/phrases in the response communications 111 are replaced with agnostic data fields, the system is able to automatically fill in the agnostic data fields with customer specific date as needed when the customer service template 135 is used in conjunction with an existing customer.

In block 217, the template generation system 100 using the intent clustering component 170 displays the clustering results, the analytics report, and/or the generated/suggested customer service templates. Such results may be displayed on an output of the system such as a template generation device 110.

In block 218, the intent clustering component 170 stores generated customer service templates 135 in the template database 130 and final clusters, clustering results, and analytics reports in the analysis database 160.

Figure 3A:
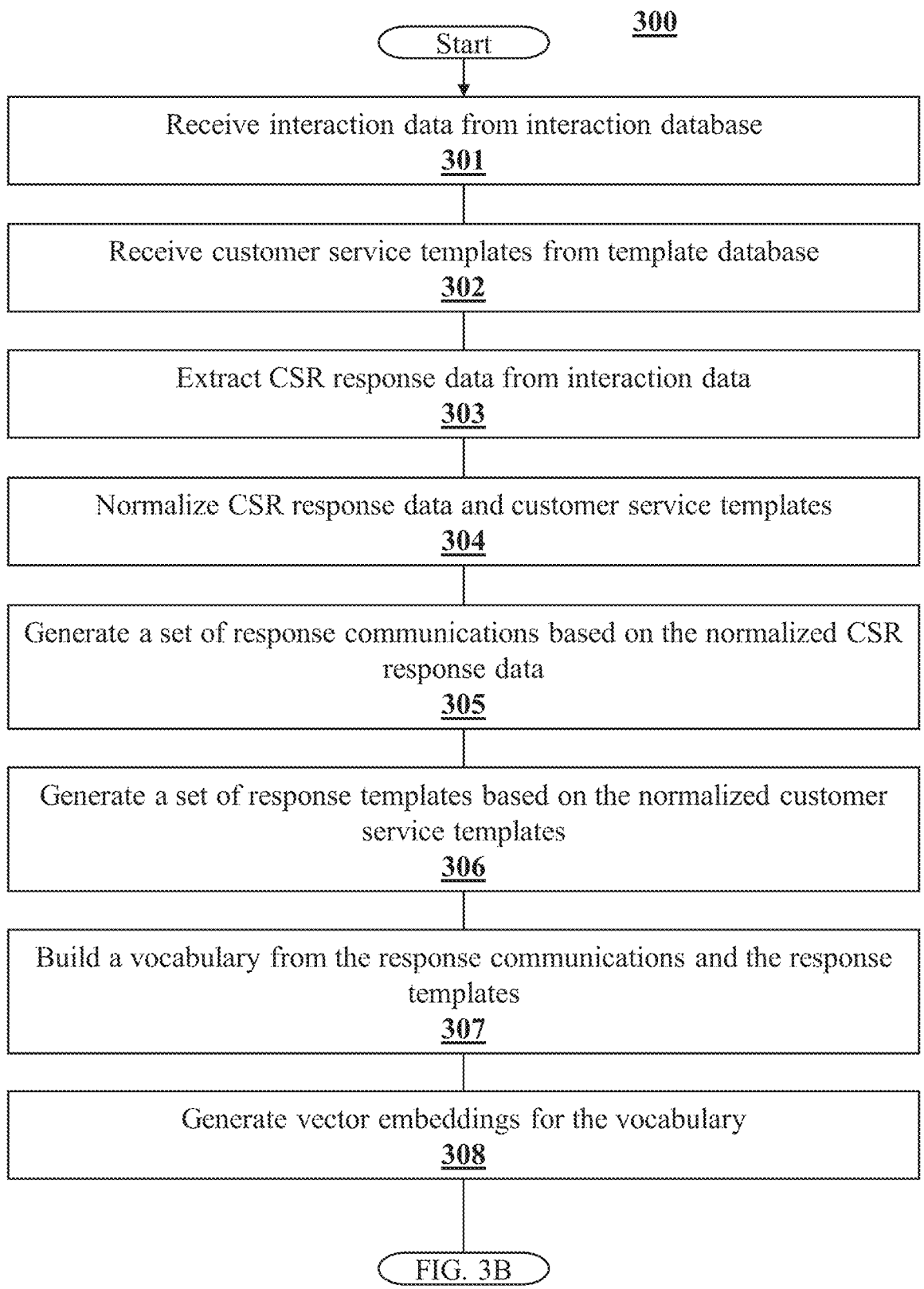
FIGS. 3A and 3B depict a flowchart of an example of a method for suggesting and generating customer service templates, according to certain embodiments.
Figure 3B:
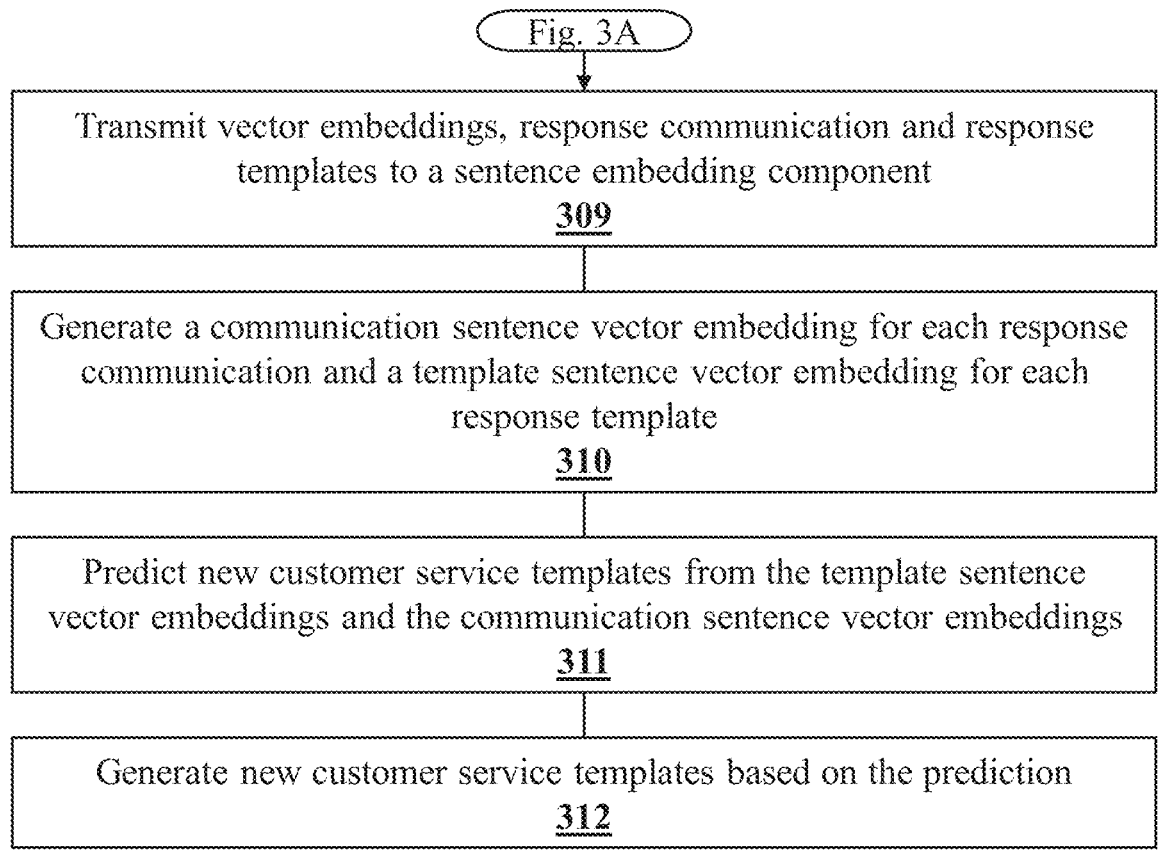

FIG. 3 depicts an example flow diagram of a method 300 for template prediction and generation according to certain embodiments. The numbering and sequencing of the blocks are for reference only; blocks or sequences of blocks may be performed out of order or repeated.

In block 301, interaction data 101 are received from an interaction database 140 by the communications processing component 153. Interaction data 101 are used to generate response communications 111. Response communications 111 are used by the language processing component 150 to encode the response communications 111 and generate communication sentence vector embeddings, which allows the intent clustering component 170 to predict and generate new customer service templates 135.

In block 302, customer service templates are received from a template database 130 by the communications processing component 153. Customer service templates 135 are used to generate response templates 112. Response templates 112 are used by the language processing component 150 to encode the response templates 112 and generate template sentence vector embeddings, which allows the intent clustering component 170 to predict and generate new customer service templates 135.

In block 303, the communications processing component 153 using an extraction component 121 extracts CSR response data 114 from the interaction data 101. In an embodiment, the extraction component 121 extracts CSR communications as CSR response data 114 from the interaction data 101 by removing any portions of the interaction data not labeled as being CSR communications. As discussed above the interaction data 101 includes interactions between customers and CSRs that have been transcribed, diarized, and labeled based on speaker/writer (customer, CSR, etc.). Depending on the size of the CEC and the level of customer interaction, the request may focus on one locale, time period, channel of communication, or any combination thereof.

In block 304, the communications processing componet153 using a normalization component 123 normalizes the CSR response data 114 and the customer service templates 135. The normalization component 123 cleans the CSR response data 114 and customer service templates 135 to render response communications 111 and response templates 112 in a standard format for encoding. In an embodiment, the normalization component 123 also performs delexicalization of the CSR response data 114. The normalization component 123 analyzes the CSR response data 114 for rendering as response communications 111, removes language specific words/phrases (e.g., customer names, account numbers, addresses, product names, etc.) and replaces the removed words/phrases with agnostic template fields (e.g., a customer name would be replaced with a "customer name" insertion data field).

In block 305, the communications processing component 153 generates a set of response communications 111 from the normalized CSR response data 114.

In block 306, the communications processing component 153 generates a set of response templates 112 from the normalized customer service templates 135.

In block 307, the communications processing component 153 builds a vocabulary 126 from the words the set of response communications 111 and the set of response templates 112. In certain embodiments, the communication processing component uses a tokenizer component to build the vocabular to cover the most used words in the response communications and the response templates. In embodiments using a pre-trained language preprocessor or an already trained language preprocessor, this block may be skipped.

In block 308, a language processing component 150 generates a plurality of vector embeddings for the vocabulary 126. In an embodiment, the language preprocessor may be a Bidirectional Encoder Representations from Transformers (BERT). In another embodiment, the language preprocessor may be BERT-as-service, run either locally or remotely. In another embodiment, the BERT-as-service may be run on a graphics processing unit (GPU) capable of running the TensorFlow open-source software library.

In block 309, the vector embeddings, set of response communications and set of response templates are transmitted to a sentence embedding component 180.

In block 310, the sentence embedding component 180 generates a communication sentence vector embedding for each response communication 111 and a template sentence vector embedding for each response template 112 based on the vector embeddings and vocabulary 126. In an embodiment, the communication sentence vector embeddings and template sentence vector embeddings are achieved by averaging each individual word embedding for each response communication/template, respectively. In embodiments, the communication sentence vector embeddings and template vector embeddings are achieved by directly calculating the embedding for the full sentence. Full sentence embeddings may be generated through a number of techniques including unsupervised models (e.g., n-gram embeddings, skip-thought vectors, Word Mover's Embedding, Sentence-BERT) and supervised models (e.g., Generative Pre-trained Transformer, Deep Semantic Similarity Model, Universal Sentence Encoder).

In block 311, an intent clustering component 170 predicts new customer service templates from the template sentence vector embeddings and the communication sentence vector embeddings. the intent clustering component 170 clusters sentence vector embeddings with similar intent to suggest and generate "new" customer service templates and/or analytics reports. Many different clustering algorithms may be used. One example embodiment uses Density-Based Spatial Clustering of Applications with Noise (DBSCAN); however, given the problem of finding similar commonly used responses, any density-based clustering technique may be suitable. Additionally, partitioning clustering algorithms (such as affinity propagation, ward hierarchical clustering, mean-shift, etc.) that account for noise and do not require a provided number of clusters may also be suitable.

In block 312, the intent clustering component 170 generates new customer service templates based on the prediction in block 310. In an embodiment the response text for the customer service template 135 may be the dominant response communication 111 within the cluster. Since the language specific words/phrases in the response communications 111 are replaced with agnostic data fields, the system can automatedly fill in the agnostic data fields with customer specific date as needed when the customer service template 135 is used in conjunction with an existing customer.

Figure 5:
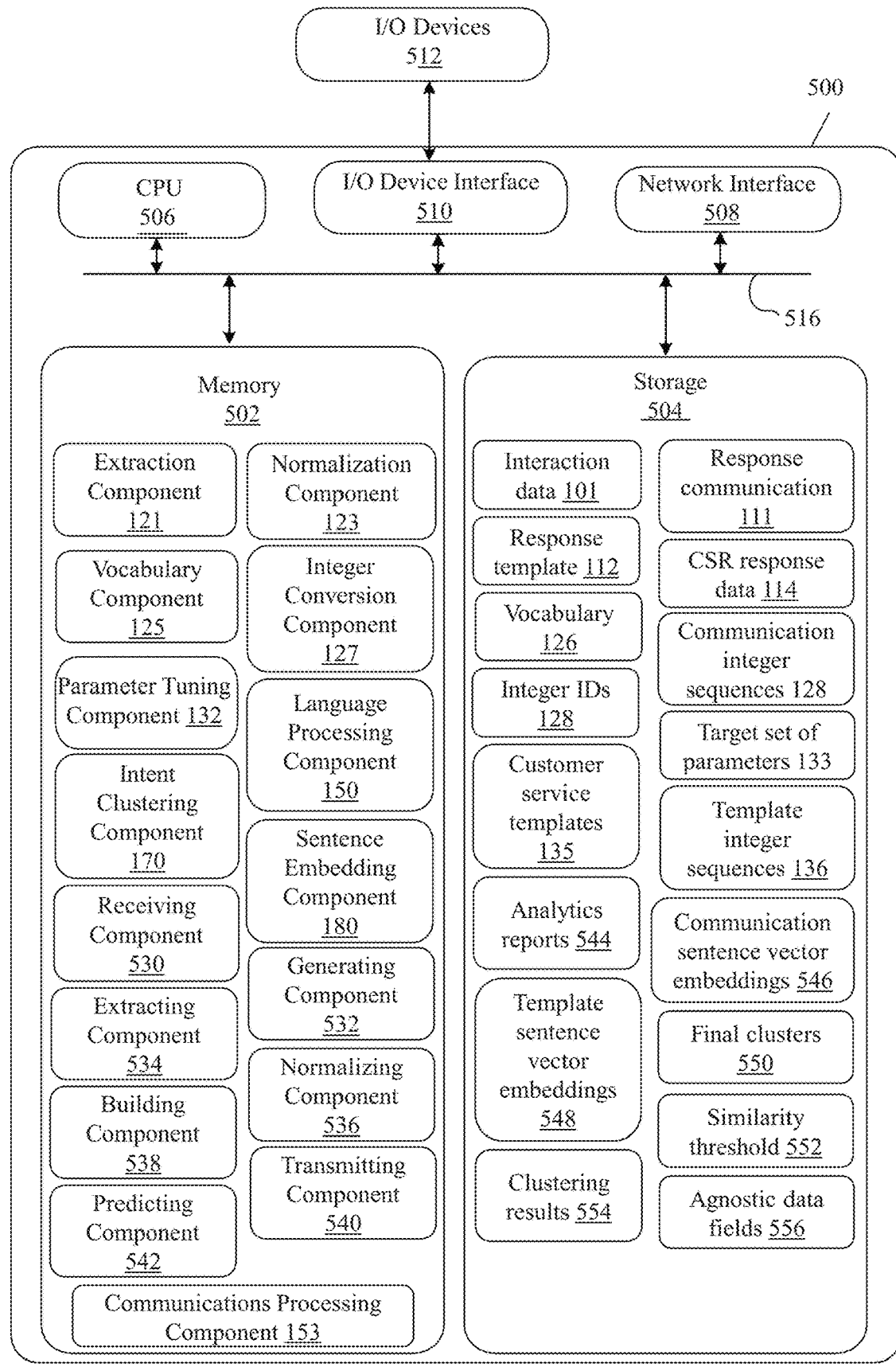
FIG. 5 depicts an example diagram of a computer device for suggesting and generating customer service templates, according to certain embodiments.

FIG. 5 depicts an example diagram of a computer system 500 that may include the kinds of software programs, data stores, hardware, and interfaces that can implement a template generation system 100 as disclosed herein and according to certain embodiments. The computing system 500 may be used to implement embodiments of portions of the template generation system 100 or in carrying out embodiments of method 200 and/or method 300. The computing system 500 may be part of or connected to an overarching customer service center system.

As shown, the computer system 500 includes, without limitation, a memory 502, a storage 504, a central processing unit (CPU) 506, and a network interface 508, each connected to a bus 516. The computing system 500 may also include an input/output (I/O) device interface 510 connecting I/O devices 512 (e.g., keyboard, display, and mouse devices) and/or a network interface 508 to the computing system 500. Further, the computing elements shown in computer system 500 may correspond to a physical computing system (e.g., a system in a data center), a virtual computing instance executing within a computing cloud, and/or several physical computing systems located in several physical locations connected through any combination of networks and/or computing clouds.

Computing system 500 is a specialized system specifically designed to perform the steps and actions necessary to execute methods 200 and 300 and template generation system 100. While some of the component options for computing system 500 may include components prevalent in other computing systems, computing system 500 is a specialized computing system specifically capable of performing the steps and processes described herein.

The CPU 506 retrieves, loads, and executes programming instructions stored in memory 502. The bus 516 is used to transmit programming instructions and application data between the CPU 506, I/O interface 510, network interface 508, and memory 502. Note, the CPU 506 can comprise a microprocessor and other circuitry that retrieves and executes programming instructions from memory 502. CPU 506 can be implemented within a single processing element (which may include multiple processing cores) but can also be distributed across multiple processing elements (with or without multiple processing cores) or sub-systems that cooperate in existing program instructions. Examples of CPUs 506 include central processing units, application-specific processors, and logic devices, as well as any other type of processing device, a combination of processing devices, or variations thereof. While there are a number of processing devices available to compromise the CPU 506, the processing devices used for the CPU 506 are particular to this system and are specifically capable of performing the processing necessary to execute methods 200 and 300 and template generation system 100.

The memory 502 can comprise any memory media readable by CPU 506 that is capable of storing programming instructions and able to meet the needs of the computing system 500 and execute the programming instructions required for methods 200 and 300 and template generation system 100. Memory 502 is generally included to be representative of a random-access memory. In addition, memory 502 may include volatile and non-volatile, removable, and non-removable media implemented in any method or technology for storage of information, such as computer-readable instructions or program components. The memory 502 may be implemented as a single memory device but may also be implemented across multiple memory devices or sub-systems. The memory 502 can further include additional elements, such as a controller capable of communicating with the CPU 506.

Illustratively, the memory includes multiple sets of programming instructions for performing the functions of the template generation system 100 and methods 200 and 300, including, but not limited to, extraction component 121, normalization component 123, vocabulary component 125, integer conversion component 127, parameter tuning component 132, language processing component 150, communications processing component 153, intent clustering component 170, and sentence embedding component 180, all of which are discussed in greater detail herein. Illustratively, the memory may also include a receiving component 530, a generating component 532, an extracting component 534, a normalizing component 536, a building component 538, a transmitting component 540, and a predicting component 542. Although memory 502, as depicted in FIG. 5 includes eleven sets of programming instruction components in the present example, it should be understood that one or more components could perform single- or multi-component functions. It is also contemplated that these components of computing system 500 may be operating in a number of physical locations.

The storage 504 can comprise any storage media readable by CPU 506 and is capable of storing data that is able to meet the needs of computing system 500 and store the data required for methods 200 and 300 and template generation system 100. The storage 504 may be a disk drive or flash storage device. The storage 504 may include volatile and non-volatile, removable, and non-removable media implemented in any method or technology for storage of information. Although shown as a single unit, the storage 504 may be a combination of fixed and/or removable storage devices, such as fixed disc drives, removable memory cards, optical storage, network-attached storage (NAS), or a storage area-network (SAN). The storage 504 can further include additional elements, such as a controller capable of communicating with the CPU 506.

Illustratively, the storage 504 may store data such as but not limited to interaction data 101, response communications 111, response templates 112, CSR response data 114, vocabulary 126, communication integer sequences 128, integer IDs 129, target set of parameters 133, customer service templates 135, template integer sequences 136, analytics reports 544, communication sentence vector embeddings 546, template sentence vector embeddings 548, final clusters 550, similarity threshold 552, clustering results 554, and agnostic data fields 556, all of which are also discussed in greater detail herein. Illustratively, the storage 504 may also store data such as but not limited to normalized CSR response data 556.

Examples of memory and storage media include random access memory, read-only memory, magnetic discs, optical discs, flash memory, virtual memory, and non-virtual memory, magnetic sets, magnetic tape, magnetic disc storage, or other magnetic storage devices, or any other medium which can be used to store the desired software components or information that may be accessed by an instruction execution system, as well as any combination or variation thereof, or any other type of storage medium. In some implementations, one or both of the memory and storage media can be a non-transitory memory and storage media. In some implementations, at least a portion of the memory and storage media may be transitory. Memory and storage media may be incorporated into computing system 500. While many types of memory and storage media may be incorporated into computing system 500, the memory and storage media used is capable of executing the storage requirements of methods 200 and 300 and template generation system 100 as described herein.

The I/O interface 510 allows computing system 500 to interface with I/O devices 512. I/O devices 512 can include one or more template generation devices 110, graphical user interfaces, desktops, a mouse, a keyboard, a voice input device, a touch input device for receiving a gesture from a user, a motion input device for detecting non-touch gestures and other motions by a user, and other comparable I/O devices and associated processing elements capable of receiving input. The I/O devices 512 through the template generation devices 110 are also integrated into the system allowing users to access the telephone system, internet system, and a text communications system, among other systems. I/O devices 512 can also include devices such as a video display or graphical display and other comparable I/O devices and associated processing elements capable of providing output. Speakers, printers, haptic devices, or other types of output devices may also be included in the I/O device 512.

A user can communicate with computing system 500 through the I/O device 512 in order to view interaction data 101, response communications 111, response templates 112, CSR response data 114, vocabulary 126, communication integer sequences 128, integer IDs 129, target set of parameters 133, customer service templates 135, template integer sequences 136, analytics reports 544, communication sentence vector embeddings 546, template sentence vector embeddings 548, final clusters 550, similarity threshold 552, clustering results 554, and agnostic data fields 556 or complete any number of other tasks the user may want to complete with computing system 500. I/O devices 512 can receive and output data such as but not limited to interaction data 101, response communications 111, response templates 112, CSR response data 114, vocabulary 126, communication integer sequences 128, integer IDs 129, target set of parameters 133, customer service templates 135, template integer sequences 136, analytics reports 544, communication sentence vector embeddings 546, template sentence vector embeddings 548, final clusters 550, similarity threshold 552, clustering results 554, and agnostic data fields 556.

As described in further detail herein, computing system 500 may receive and transmit data from and to the network interface 508. In embodiments, the network interface 508 operates to send and/or receive data, such as but not limited to, interaction data 101, response communications 111, response templates 112, CSR response data 114, vocabulary 126, communication integer sequences 128, integer IDs 129, target set of parameters 133, customer service templates 135, template integer sequences 136, analytics reports 544, communication sentence vector embeddings 546, template sentence vector embeddings 548, final clusters 550, similarity threshold 552, clustering results 554, and agnostic data fields 556 to/from other devices and/or systems to which computing system 500 is communicatively connected, and to receive and process interactions as described in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the foregoing description.

What is claimed is:

1. A method for predicting, suggesting, and generating a customer service template, the method comprising:
   Receiving an interaction data from an interaction database;
   receiving a plurality of customer service templates from a template database;
   extracting a customer service representative (CSR) response data from the interaction data;
   normalizing the CSR response data and the plurality of customer service templates;
   generating a set of response communications from the normalized CSR response data;
   generating a set of response templates from the normalized plurality of customer service templates;
   building a vocabulary from words in the set of response communications and the set of response templates;
   generating a plurality of vector embeddings for the vocabulary;
   transmitting the plurality of vector embeddings, the set of response communications, and the set of response templates to a sentence embedding component;
   generating a communication sentence vector embedding for each response communication and a template sentence vector embedding for each response template based on the plurality of vector embeddings for the vocabulary;
   predicting a plurality of new customer service templates from the template sentence vector embedding and the communication sentence vector embedding; and
   generating the plurality of new customer service templates based on the predicting.

2. The method of claim 1, wherein the communication sentence vector embedding is generated by averaging a vector embedding for each word in a response communication; and wherein the template sentence vector embedding is generated by averaging a vector embedding for each word in a response template.

3. The method of claim 1, wherein predicting new customer service templates includes:

for each communication sentence vector embedding, calculating a cosine similarity between the communication sentence vector embedding and all template sentence vector embeddings; and for each cosine similarity that is greater than a similarity threshold, removing the communication sentence vector embedding associated with the cosine similarity.

4. The method of claim 1, wherein predicting new customer service templates includes:

reducing a dimensionality of the communication sentence vector embeddings while maintaining a predetermined percentage of variance between the communication sentence vector embeddings;

running a parameter tuning algorithm to find a set of parameters based on a Davies-Bouldin score of clustering results; and running a clustering algorithm on the communication sentence vector embeddings, wherein the clustering algorithm uses the set of parameters.

5. The method of claim 4, wherein the clustering algorithm is one of a Density-Based Spatial Clustering of Applications with Noise or an Iterative Density-Based Spatial Clustering of Applications with Noise.

6. The method of claim 1, further comprising generating an analytics report including results from the predicting of new customer service templates.

7. The method of claim 1, wherein the plurality of vector embeddings are generated using one of a Generative Pre-trained Transformer 2 (GPT-2), a Generative Pre-trained Transformer 3 (GPT-3), a Bidirectional Encoder Representations from Transformers (BERT), a XLNet, a ELECTRA, a ALBERT, a DistilBERT, or a ROBERTa; and further wherein the template sentence vector embeddings and communication sentence vector embeddings are generated using one of n-gram embedding, skip-thought vector, Word Mover's Embedding, Sentence-BERT, Generative Pre-trained Transformer, Deep Semantic Similarity Model, or Universal Sentence Encoder.

8. A system for predicting, suggesting, and generating customer service templates in a customer engagement system, comprising:

a memory comprising computer readable instructions;

a processor configured to read the computer readable instructions that when executed causes the system to:

receive an interaction data from an interaction database;

receive a plurality of customer service templates from a template database;

extract a customer service representative (CSR) response data from the interaction data;

normalize the CSR response data and customer service templates;

generate a set of response communications from the normalized CSR response data;

generate a set of response templates from the normalized plurality of customer service templates;

build a vocabulary from words in the set of response communications and the set of response templates;

generate a plurality of vector embeddings for the vocabulary;

transmit the plurality of vector embeddings, the set of response communications, and the set of response templates to a sentence embedding component;

generate a communication sentence vector embedding for each response communication and a template sentence vector embedding for each response template based on the plurality of vector embeddings for the vocabulary;

predict a plurality of new customer service templates from the template sentence vector embeddings and the communication sentence vector embeddings; and generate the plurality of new customer service templates based on the predicting.

9. The system of claim 8, wherein the communication sentence vector embedding is generated by averaging a vector embedding for each word in a response communication; and wherein the template sentence vector embedding is generated by averaging a vector embedding for each word in a response template.

10. The system of claim 8, wherein predicting new customer service templates includes computer readable instructions that further cause the system to:

for each communication sentence vector embedding, calculate a cosine similarity between the communication sentence vector embedding and all template sentence vector embeddings; and for each cosine similarity that is less than a similarity threshold, remove the communication sentence vector embedding associated with the cosine similarity.

11. The system of claim 8, wherein predicting new customer service templates includes computer readable instructions that further cause the system to:

reduce a dimensionality of the communication sentence vector embeddings while maintaining a predetermined percentage of variance between the communication sentence vector embedding;

run a parameter tuning algorithm to find a set of parameters based on a Davies-Bouldin score of clustering results; and run a clustering algorithm on the communication sentence vector embeddings, wherein the clustering algorithm uses the set of parameters.

12. The system of claim 11, wherein the clustering algorithm is one of a Density-Based Spatial Clustering of Applications with Noise or an Iterative Density-Based Spatial Clustering of Applications with Noise.

13. The system of claim 8, wherein the system is further caused to generate an analytics report including results from predicting new customer service templates.

14. The system of claim 8, wherein the plurality of vector embeddings are generated using one of a Generative Pre-trained Transformer 2 (GPT-2), a Generative Pre-trained Transformer 3 (GPT-3), a Bidirectional Encoder Representations from Transformers (BERT), a XLNet, a ELECTRA, a ALBERT, a DistilBERT, or a ROBERTa; and further wherein the template sentence vector embeddings and communication sentence vector embeddings are generated using one of n-gram embedding, skip-thought vector, Word Mover's Embedding, Sentence-BERT, Generative Pre-trained Transformer, Deep Semantic Similarity Model, or Universal Sentence Encoder.

15. A non-transitory computer readable medium comprising computer readable code to predict, suggest, and generate customer service templates on a system that when executed by a processor, causes the system to:
- Receive an interaction data from an interaction database;
- receive a plurality of customer service templates from a template database;
- extract a customer service representative (CSR) response data from the interaction data;
- normalize the CSR response data and customer service templates;
- generate a set of response communications from the normalized CSR response data;
- generate a set of response templates from the normalized plurality of customer service templates;
- build a vocabulary from words in the set of response communications and the set of response templates;
- generate a plurality of vector embeddings for the vocabulary;
- transmit the plurality of vector embeddings, the set of response communications, and the set of response templates to a sentence embedding component;
- generate a communication sentence vector embedding for each response communication and a template sentence vector embedding for each response template based on the plurality of vector embeddings for the vocabulary;
- predict a plurality of new customer service templates from the template sentence vector embeddings and the communication sentence vector embeddings; and
- generate the plurality of new customer service templates based on predicting new customer service templates.

16. The non-transitory computer readable medium of claim 15, wherein the communication sentence vector embedding is generated by averaging a vector embedding for each word in a response communication; and
wherein the template sentence vector embedding is generated by averaging a vector embedding for each word in a response template.

17. The non-transitory computer readable medium of claim 15, wherein predicting new customer service templates includes causing the system to:
- for each communication sentence vector embedding, calculate a cosine similarity between the communication sentence vector embedding and all template sentence vector embeddings; and
- for each cosine similarity that is less than a similarity threshold, remove the communication sentence vector embedding associated with the cosine similarity.

18. The non-transitory computer readable medium of claim 15, wherein predicting new customer service templates includes causing the system to:
- reduce a dimensionality of the communication sentence vector embeddings while maintaining a predetermined percentage of variance between the communication sentence vector embedding;
- run a parameter tuning algorithm to find a set of parameters based on a Davies-Bouldin score of clustering results; and
- run a clustering algorithm on the communication sentence vector embeddings, wherein the clustering algorithm uses the set of parameters.

19. The non-transitory computer readable medium of claim 18, wherein the clustering algorithm is one of a Density-Based Spatial Clustering of Applications with Noise or an Iterative Density-Based Spatial Clustering of Applications with Noise.

20. The non-transitory computer readable medium of claim 15, wherein the system is further caused to generate an analytics report including results from predicting of new customer service templates.

* * * * *